United States Patent
Chan

(10) Patent No.: US 9,634,805 B2
(45) Date of Patent: Apr. 25, 2017

(54) PACKET TRANSMISSION METHOD

(71) Applicant: ACCTON TECHNOLOGY CORPORATION, Hsinchu (TW)

(72) Inventor: Chi-Chen Chan, Taipei (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 90 days.

(21) Appl. No.: 14/706,942

(22) Filed: May 7, 2015

(65) Prior Publication Data

US 2016/0261377 A1    Sep. 8, 2016

(30) Foreign Application Priority Data

Mar. 5, 2015 (TW) .............................. 104107031 A

(51) Int. Cl.
*H04L 1/18* (2006.01)
*H04L 1/00* (2006.01)
*H04L 1/22* (2006.01)

(52) U.S. Cl.
CPC .......... *H04L 1/1874* (2013.01); *H04L 1/0001* (2013.01)

(58) Field of Classification Search
CPC ....... H04L 1/08; H04L 1/1607; H04L 1/1809; H04L 1/1887; H04L 1/1812; H04L 1/1874; H04L 1/0001; H04W 48/20; H04W 48/18
See application file for complete search history.

(56) References Cited

U.S. PATENT DOCUMENTS 6,567,416 B1 * 5/2003 Chuah ................. H04L 12/2602
                                                               370/347
2004/0001493 A1 * 1/2004 Cloonan ................. H04L 47/10
                                                               370/395.42
2006/0028997 A1 * 2/2006 McFarland ......... H04L 12/2803
                                                               370/252
2006/0187885 A1 * 8/2006 Roy ....................... H04L 1/0015
                                                               370/332
2008/0069009 A1 * 3/2008 Zhang ................... H04W 12/02
                                                               370/254
2008/0304485 A1 * 12/2008 Sinha ..................... H04L 12/66
                                                               370/392

(Continued)

OTHER PUBLICATIONS

Calhoun, et al., CAPWAP Protocol Specification, Mar. 2009, RFC 5415, p. 35.*

*Primary Examiner* — April Y Blair
*Assistant Examiner* — Dipakkumar Gandhi
(74) *Attorney, Agent, or Firm* — CKC & Partners Co., Ltd.

(57) ABSTRACT

A packet transmission method is provided herein. The packet transmission method is adapted for a wireless distribution system. The packet transmission method includes: generating a packet by an access controller or a wireless access point; determining whether the packet belongs to CAPWAP (Control and Provisioning of Wireless access point s) packet; adding a tag into a packet descriptor corresponding to the packet when the packet belongs to CAPWAP packet; transmitting the packet to the wireless access point or transmitting the packet to the access controller; determining whether an error is occurred during transmitting the packet; determining whether the packet descriptor corresponding to the packet includes the tag when the error is occurred during transmitting the packet; and adding the packet into a queue when the packet descriptor corresponding to the packet includes the tag.

12 Claims, 3 Drawing Sheets

(56) References Cited

U.S. PATENT DOCUMENTS

2010/0124178 A1* 5/2010 Baccelli .............. H04W 52/286
370/252
2013/0343192 A1* 12/2013 Kotecha .................... H04L 1/18
370/235

* cited by examiner

PACKET TRANSMISSION METHOD

RELATED APPLICATIONS

This application claims priority to Taiwanese Application Serial Number 104107031 filed Mar. 5, 2015, which is herein incorporated by reference.

BACKGROUND

Field of Invention

The present invention relates to a packet transmission method. More particularly, the present invention relates to a transmission method for a Control and Provisioning of Wireless Access Point (CAPWAP) packet in a wireless distribution system.

Description of Related Art

In a wireless distribution system (WDS), wireless connections can be established through multiple wireless access points (AP), so as to extend a distribution range or coverage of the wireless network. When a new wireless access point is to be added into or joined the wireless distribution system, a wireless distribution connection has to be configured before a CAPWAP authentication is performed. Then, a CAPWAP packet is transmitted to each wireless access point through the wireless distribution connection.

CAPWAP is a specification (RFC 5415 and 5416) developed by Internet Engineering Task Force (IETF) based on a connection technology of Ethernet. It defines a communication standard of a wireless local area network access controller (AC) capable of managing a group of wireless access points in a 802.11 wireless network environment. Because the protocol operates based on Internet Protocol (IP) and User Datagram Protocol (UDP), it is required to obtain an IP address and establish a connection to the internet before the wireless access points operate based on the protocol.

However, CAPWAP operates according to UDP based on Ethernet, and UDP only provides unreliable transmissions. Therefore, when a packet is lost in the wireless transmission environment, CAPWAP cannot identify the cause of losing the packet so that operations related to CAPWAP such as addition, identification and control management of access points cannot be performed.

For example, for a management of a controlling channel between the access controller and the wireless access point, if a packet is destroyed due to interference or collision when the wireless access point transmits an echo request message to the access controller, then the controller may determine that the wireless access point is not found or is damaged, and may set a connection state of the wireless access point as off-line because CAPWAP cannot identify the cause of losing the packet. Thus, when CAPWAP operates in the wireless distribution system, if a new wireless access point is to be added or a related authentication is performed, an error is likely to occur because the packet is likely to be lost.

Therefore, under the condition that the packet is likely to be erroneous in the wireless distribution system, how to prevent the CAPWAP packet from being lost becomes a problem to be solved in the industry.

SUMMARY

To solve the above problems, the present invention provides a packet transmission method to prevent the CAPWAP packet from being lost in the wireless distribution system, and to decrease the probability of causing an error when transmitting the CAPWAP packet in the wireless distribution system.

An aspect of the invention is related to a packet transmission method, adapted for the wireless distribution system. The wireless distribution system includes a wireless local area network access controller (AC), a first wireless access point and a second wireless access point. The AC communicates with the first wireless access point through the Ethernet. The first wireless access point communicates with the second wireless access point through a wireless connection. The packet transmission method includes: determining whether a packet of the AC or the second wireless access point belongs to a CAPWAP packet; adding a tag into a packet descriptor corresponding to the packet when the packet belongs to the CAPWAP packet; transmitting the packet from the first wireless access point to the second wireless access point, or transmitting the packet from the second wireless access point to the first wireless access point; determining whether the operation of transmitting the packet has an error; determining whether the packet descriptor has the tag when the operation of transmitting the packet has the error; and adding the packet into a queue when the packet descriptor has the tag.

According to an embodiment of the invention, the packet transmission method includes: re-transmitting the packet in the queue to the second wireless access point or to the first wireless access point.

According to an embodiment of the invention, the operation of re-transmitting the packet in the queue includes: determining whether the operation of re-transmitting the packet in the queue has an error; and removing the packet from the queue when the operation of re-transmitting the packet in the queue has no error.

According to an embodiment of the invention, the operation of re-transmitting the packet in the queue includes: determining whether a transmission state of the packet in the queue is normal; re-transmitting the packet in the queue to the second wireless access point or to the first wireless access point when the transmission state of the packet in the queue is normal.

According to an embodiment of the invention, wherein the operation of re-transmitting the packet in the queue further includes: generating an event and informing a main program of CAPWAP of the event when the transmission state of the packet in the queue is abnormal; and removing the packet of which the transmission state is abnormal from the queue.

According to an embodiment of the invention, the operation of determining whether the transmission state is normal includes: determining whether a storage period of the packet in the queue is shorter than a predetermined period; and determining that the transmission state of the packet in the queue is normal when the storage period is shorter or equal to the predetermined period.

According to an embodiment of the invention, the operation of determining whether the transmission state is normal includes: determining whether a number of times of transmitting the packet in the queue is smaller than a predetermined number; and determining that the transmission state of the packet in the queue is normal when the number of times of transmitting the packet in the queue is smaller than or equal to the predetermined number.

According to an embodiment of the invention, the operation of re-transmitting the packet in the queue includes: decreasing a transmission rate of the packet in the queue.

According to an embodiment of the invention, the packet transmission method further includes: excluding performing a packet aggregation procedure on the packet when the packet belongs to the CAPWAP packet.

According to an embodiment of the invention, the operation of determining whether the operation of transmitting the packet has the error includes: determining that the operation of transmitting the packet has the error if the packet is transmitted to the second wireless access point and an acknowledgement (ACK) returned by the second wireless access point is not received during a transmission period; or determining that the operation of transmitting the packet has the error if the packet is transmitted to the first wireless access point and an acknowledgement returned by the first wireless access point is not received during the transmission period.

As discussed above, in the wireless distribution system, whether a transmitted packet belongs to the CAPWAP packet is rapidly determined by adding a tag into a packet descriptor corresponding to the packet and determining whether the packet descriptor corresponding to the packet has the tag. In addition, if the operation of transmitting the CAPWAP packet has an error, the CAPWAP packet causing the error is added into the queue, and the packet in the queue is re-transmitted so that it prevent the CAPWAP packet from being lost during the transmission. Furthermore, the probability of causing the error when transmitting the CAPWAP packet is further decreased by excluding performing the aggregation procedure on the CAPWAP packet or decreasing the transmission rate of the packet in the queue.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size. For the convenience of understanding, identical units in the following description will be labelled with the same reference.

A term used in the specification and the claims has general meaning, unless it is particularly noted, of the term used in this field, in the content of the description and in the special content. Some terms used for describing the disclosure will be discussed below or in other part of the specification to provide an additional guide of description related to the disclosure for people in the art.

As used herein with respect to the "first", "second", etc., not specifically alleged order or overall meaning, nor to limit the invention, it is just to distinguish technical terms to describe the same elements or operations only.

Terminology used herein "comprising", "including", "having", "containing", etc. are open terms that mean including but not limited to.

Figure 1:
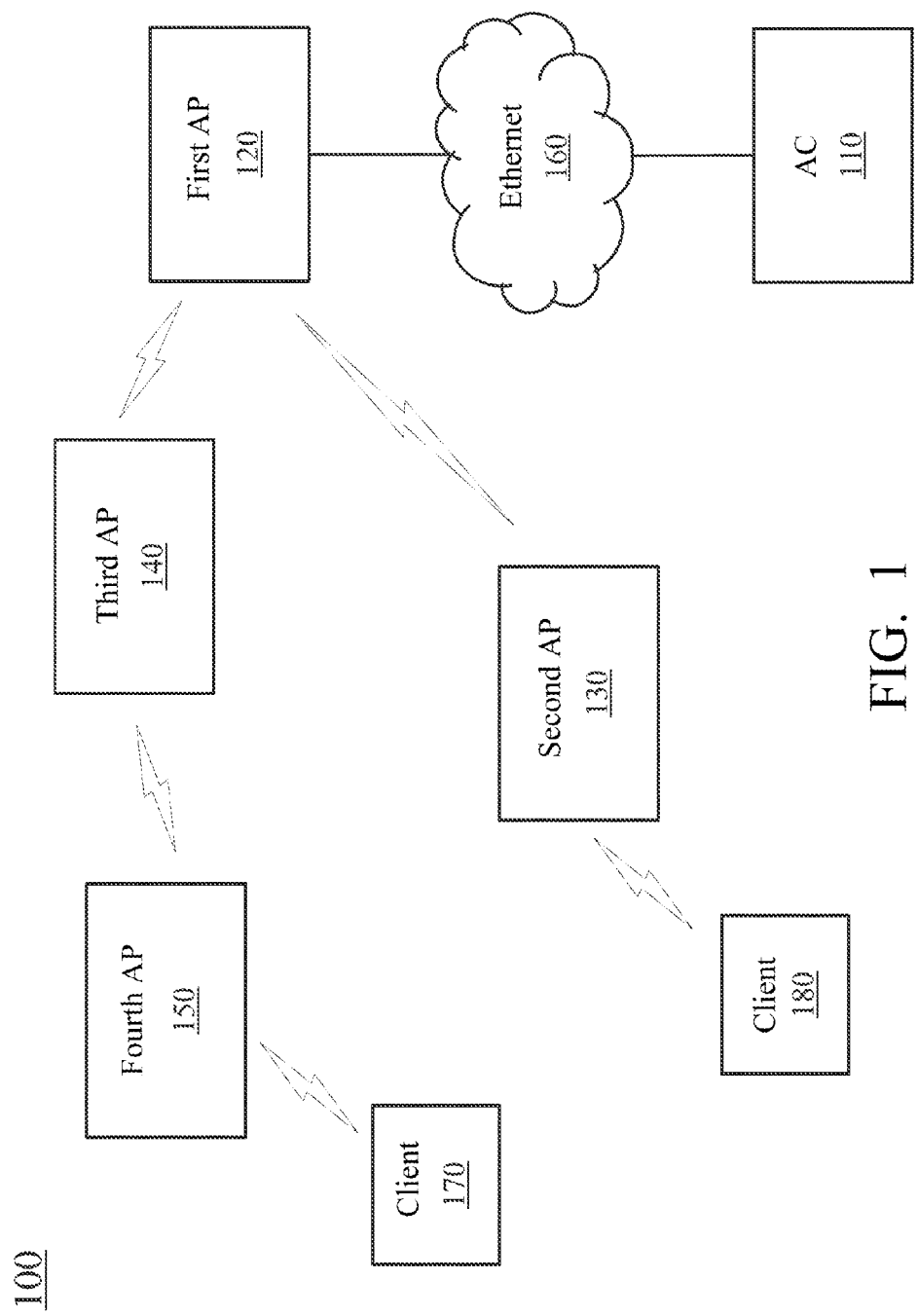
FIG. 1 is schematic diagram illustrating a wireless distribution system according to an embodiment of the invention.

Referring to FIG. 1, FIG. 1 is a schematic diagram illustrating a wireless distribution system (WDS) 100 according to an embodiment of the invention. As shown in FIG. 1, the wireless distribution system 100 includes a wireless local area network access controller (AC) 110 and wireless access points (AP) such as a first wireless access point 120, a second wireless access point 130, a third wireless access point 140 and a fourth wireless access point 150. In the embodiment, the number of the wireless access points is just exemplary; in other words, people skilled in the art may set the number of the wireless access points according to practical needs.

The wireless access points may be wireless receiver boxes or wireless network stations. In the embodiment, the AC 110 establishes a communication connection to the first wireless access point 120 (e.g. main station) through an Ethernet 160. That is, the AC 110 communicates with the first wireless access point 120 through the Ethernet 160.

In addition, wireless connections (i.e. wireless distribution system links (WDS links)) may be established between the first wireless access point 120, the second wireless access point 130 (e.g. wireless receiver box), the third wireless access point 140 (e.g. wireless receiver box) and the fourth wireless access point 150 (e.g. wireless receiver box). In other words, the wireless access points can communicate with the each other through the wireless connection to expand a distribution range of the wireless network.

Therefore, clients 170 and 180 (e.g. mobile devices having wireless connections such as cell phones, computers, etc.) may transmit data through each wireless access point. For example, the client 170 can transmit data to the AC 110 through the fourth wireless access point 150, the third wireless access point 140 and the first wireless access point 120. Alternatively, the AC 110 may transmit data to the client 180 through the first wireless access point 120 and the second wireless access point 130. To sum up, the wireless distribution system 100 can extend a wireless network by the first wireless access point 120 to the fourth wireless access point 150 without using a traditional wire connection.

Figure 2:
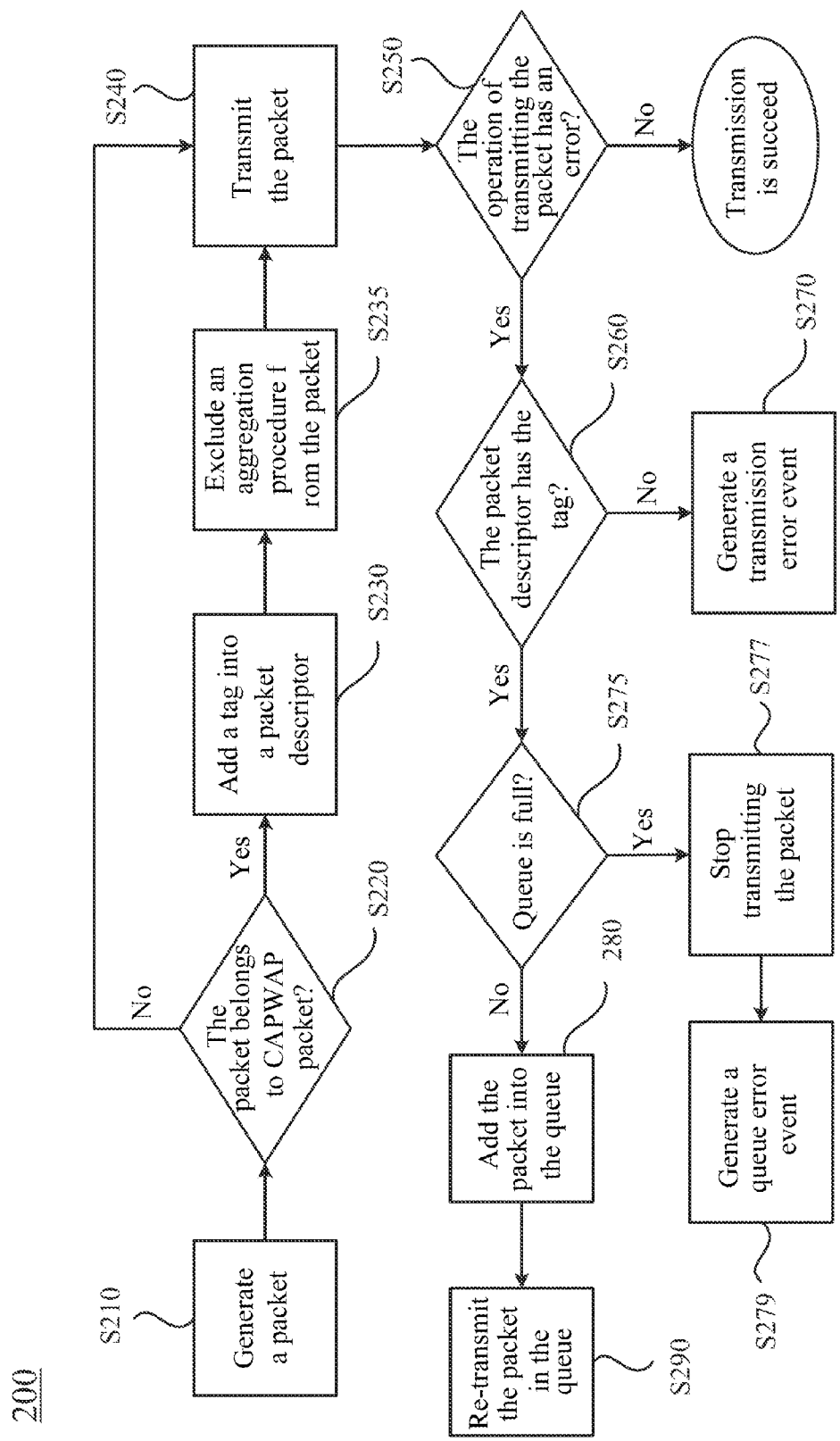
FIG. 2 is a flow chart of a packet transmission method according to an embodiment of the invention.

Referring FIG. 1 and FIG. 2 together, FIG. 2 is a flow chart of a packet transmission method 200 according to an embodiment of the invention. The packet transmission method 200 may be applied to the wireless distribution system 100 shown in FIG. 1. To be specific, the packet transmission method 200 is implemented in a wireless distribution system structure which CAPWAP is applied to. The packet transmission method 200 is used to transmit a CAPWAP packet to the wireless access points (e.g. to at least one of the first wireless access point 120 to the fourth wireless access point 150) in the wireless distribution system 100 through the AC 110 or to transmit the CAPWAP packet to the AC 110 through the wireless access points in the wireless distribution system, and to prevent the transmitted packet from being lost.

The packet transmission method 200 can be implemented as a computer program product (e.g. an application) and stored in a computer readable recording medium, so that a computer reads the recording medium and then performs the packet transmission method 200. The computer readable recording medium can be a read-only memory, a flash memory, a floppy disk, a hard disk, a compact disk, a pen drive, a magnetic tape, a database capable of being accessed on the internet, or other computer readable recording media having the same functions that people skilled in the art can easily think of. In an embodiment, the packet transmission method 200 can be implemented in a wireless Media Access Control (MAC) layer, and implemented in each network device (e.g. devices between each wireless access point) in the wireless distribution system.

As shown in FIG. 2, first, in a step S210, a packet is generated by the AC 110 or a wireless access point (e.g. the second wireless access point 130). Then, in a step S220, whether the packet belongs to a CAPWAP packet is determined. When the packet belongs to the CAPWAP packet, a step S230 is performed. In the step S230, a tag is added into a packet descriptor corresponding to the packet. The tag is used to identify whether the packet is the CAPWAP packet. In general, when a network host generates or receives the packet, it simultaneously generates the packet descriptor corresponding to the packet. The packet descriptor describes content, such as a state, a format, etc. of the packet. In an embodiment, the application of the packet transmission method 200 can generate the tag according to a packet format of CAPWAP and add it into the packet descriptor corresponding to the packet. As a result, for the packet to be transmitted, the application of the packet transmission method 200 can determine whether the packet belongs to the CAPWAP packet by determining whether the packet descriptor of the transmitted packet has the tag. The packet transmission method 200 only generates the tag for the packet belonging to CAPWAP packet, and therefore, whether the transmitted packet belongs to the CAPWAP packet is rapidly determined by determining the tag of the packet descriptor. The invention uses a packet identification ability of each wireless device in the wireless distribution system connection to identify the CAPWAP packet.

Next, a step S240 is performed. In the step S240, the packet generated by the AC 110 is transmitted to the wireless access point (e.g. the first wireless access point 120, the third wireless access point 140 or the fourth wireless access point 150), or the packet generated by one of the wireless access points (e.g. the second wireless access point 130) is transmitted to another wireless access point (e.g. the first wireless access point 120, the third wireless access point 140 or the fourth wireless access point 150) or the AC 110. In brief, a general transmission operation is performed on the packet.

Returning to the step S220, when the packet does not belong to the CAPWAP packet, the step S240 is performed directly.

In an embodiment, a step S235 is performed before transmitting the packet if the packet belongs to the CAPWAP packet. In the step S235, performing an aggregation procedure on the packet belonging to CAPWAP packet is excluded. The aggregation procedure is used to aggregate several packets and package them as a transmission unit. In general, in a wireless protocol, the aggregation procedure is performed on the packets being transmitted to increase a throughput and increase an efficiency of transmission. However, the throughput is not a goal of the CAPWAP packet because the goal of the CAPWAP packet is authenticating and managing the wireless access points. Therefore, in the embodiment, the packet aggregation procedure is not performed on the CAPWAP packet before transmitting the CAPWAP packet. As a result, if the operation of transmitting the CAPWAP packet has an error (e.g. lost), other packets are not affected and lost together, and thus a probability of the error occurring on the other packets is decreased (consider that the probability of losing packets in the wireless network environment of the wireless distribution system is higher than that in a wire Ethernet environment).

A step S250 is performed after transmitting the packet. In the step S250, it is determined whether the operation of transmitting the packet has an error. In other words, it is determined whether an error occurs during the process of transmitting the packet to the wireless access point or transmitting the packet to the AC 110. In an embodiment, when the packet is transmitted to the wireless access point and an acknowledgement (ACK) returned by the wireless access point is not received during a transmission period, it is determined that the operation of transmitting the packet has the error; alternatively, when the packet is transmitted to the AC 110 and an acknowledgement returned by the AC 110 is not received during the transmission period, it is determined that the operation of transmitting the packet has the error. However, the invention is not limited to the type or the cause of the error such as discussed overdue return or re-transmitting over a preset number of times.

When the operation of transmitting the packet does not have the error, it means the data transmission succeeds. If the operation of transmitting the packet has the error, a step S260 is performed.

In a step S260, it is determined whether the packet descriptor corresponding to the packet causing a transmission error has the tag. In other words, whether the packet belongs to the CAPWAP packet is determined. When the packet descriptor of the packet causing the error does not have the tag, a step S270 is performed. In the step S270, a transmission error event is generated, and the transmission error event is returned to a network driver (not shown in the figures). In the embodiment, the packet transmission method 200 is mainly used to prevent the CAPWAP packet from being lost (because CAPWAP only provides an unreliable transmission). Therefore, the transmission error of other types of packets is passed to the network driver to decide how to deal with it.

When the packet descriptor of the packet causing the transmission error has the tag, a step S280 is performed. In the step S280, the packet (i.e. the CAPWAP packet) is added into a queue. In other words, all the packets in the queue are the CAPWAP packets that have caused the error during a transmission process. Therefore, further processes may be performed on the packets in the queue to prevent the packets from failing in transmitting to a target correctly and from causing the aforementioned error.

In an embodiment, a step S290 is performed after adding the CAPWAP packet causing the error into the queue. In the step S290, the packet in the queue is re-transmitted to the target device. In other words, the packet which is originally transmitted (but failed) to the wireless access point or to the AC 110 is re-transmitted again to the wireless access point or to the AC 110. Accordingly, it avoids the possibility of losing the CAPWAP packet during the transmission process.

In an embodiment, before adding the packet into the queue, when the packet descriptor of the packet has the tag, a step S275 may further be performed. In the step S275, whether the queue is full is determined. When the queue is not full, the step S280 is performed. When the queue is already full, a step S277 is performed. In the step S277, the transmission of the packet is stopped. As such, it prevents more packets from being lost. Next, a step S279 is performed. In the step S279, a queue error event is generated and returned to the main program of CAPWAP to determine the cause of the queue error and to perform a subsequent process according to the specification of CAPWAP.

Figure 3:
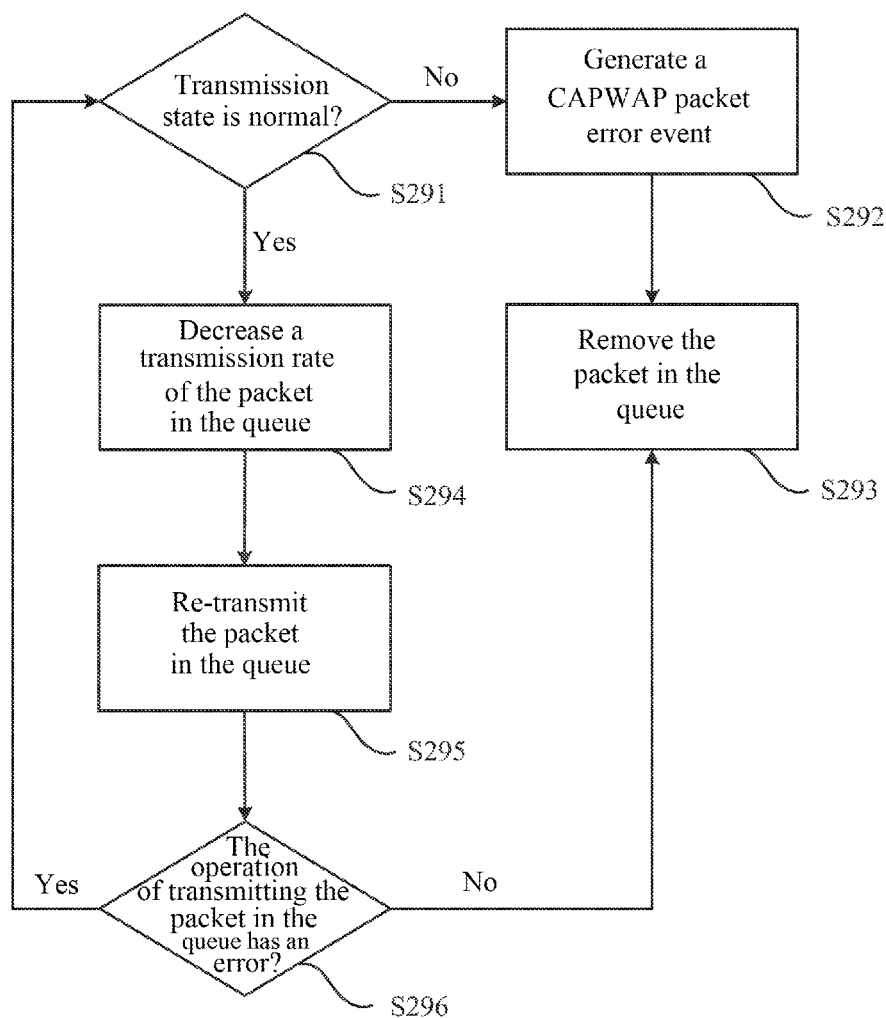
FIG. 3 is a flow chart of a step in the packet transmission method according to an embodiment of the invention.

Referring to FIG. 2 and FIG. 3 together, FIG. 3 is a flow chart of the step S290 in the packet transmission method 200 according to an embodiment of the invention. As shown in FIG. 3, the step S290 further includes steps S291 to S296. First, in the step S291, it is determined whether a transmission state of the packet in the queue (i.e. the CAPWAP packet causing the error) is normal. To be specific, part of the packets in the queue may have been stored in the queue for too long (e.g. 2 seconds), or numbers of transmission times of part of the packets in the queue are too large (e.g. 4 times). In other words, part of the packets cannot be successfully transmitted to the target even they are re-transmitted for many times, and therefore these packets may need another process.

When the transmission state of the packet in the queue is abnormal, a step S292 is performed. In the step S292, a CAPWAP packet transmission error event is generated, and the CAPWAP packet transmission error event is returned to the main program of CAPWAP. In other words, the cause of the error when transmitting the CAPWAP packet is determined by the main program of CAPWAP which performs a subsequent process according to the specification of CAPWAP.

Next, a step S293 is performed. In the step S293, the packet in the queue is removed from the queue. In other words, the abnormal CAPWAP packets are removed from the queue so as to clear the queue.

When the transmission state of the packet in the queue is normal, a step S294 is performed. In the step S294, a transmission rate of the packet in the queue is decreased. Because all of the packets stored in the queue have caused an error, in order to avoid generating the same error again when transmitting the packets in the queue, the transmission rate of transmitting the packet in the queue (i.e. decreasing a modulation rate) is decreased to decrease the possibility of losing the packet. In an embodiment, the transmission rate of the packet in the queue can be set as a multicast rate. In other words, the multicast rate is 11 Mbps when the band is 2.4 GHz, and the multicast rate is 6 Mbps when the band is 5 GHz.

Next, in a step S295, the packet in the queue is re-transmitted to the target device. In other words, the packet which is originally transmitted (but failed) to the wireless access point or to the AC 110 is re-transmitted to the wireless access point or to the AC110 again with the decreased transmission rate.

Then, in a step S296, it is determined whether the operation of re-transmitting the packet in the queue has an error. When the operation of re-transmitting the packet in the queue has the error, it goes back to the step S291. When the operation of re-transmitting the packet in the queue does not have the error, it goes back to the step S293. The CAPWAP packet which has been successfully transmitted is removed from the queue so as to clear the queue.

In an embodiment, it is determined whether the transmission state of the packet in the queue is normal by determining whether a storage period of the packet in the queue is longer than a predetermined period (e.g. 2 seconds). When the storage period of the packet in the queue is longer than the predetermined period, then the transmission state of the packet in the queue is determined to be abnormal; in contrast, when the storage period of the packet in the queue is shorter than the predetermined period, then the transmission state of the packet in the queue is determined to be normal.

In another embodiment, it is determined whether the transmission state of the packet in the queue is normal by determining if a number of times of transmitting the packet in the queue is larger than a predetermined number (e.g. 4). When the number of times of transmitting the packet in the queue is larger than the predetermined number, then it is determined that the transmission state of the packet in the queue is abnormal; in contrast, when the number of times of transmitting the packet in the queue is smaller than or equal to the predetermined number, then it is determined that the transmission state of the packet in the queue is normal.

The aforementioned embodiments of the invention shows that, in the wireless distribution system, whether a transmitted packet belongs to the CAPWAP packet is rapidly determined by adding the tag into the packet descriptor corresponding to the packet and determining if the packet descriptor of the packet has the tag. In addition, if the operation of transmitting the CAPWAP packet has as error, the CAPWAP packet causing the error may be added into the queue for the subsequent process. For example, the packet in the queue is re-transmitted to prevent the CAPWAP packet from being lost during the transmission. Furthermore, the probability of causing the error when transmitting the CAPWAP packet is further decreased by excluding performing the packet aggregation procedure on the CAPWAP packet or decreasing the transmission rate of the packet in the queue.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention.

What is claimed is:

1. A packet transmission method, adapted for a wireless distribution system (WDS), wherein the wireless distribution system comprises a wireless local area network access controller (AC), a first wireless access point (AP) and a second wireless access point, and the AC communicates with the first wireless access point through an Ethernet, and the first wireless access point communicates with the second wireless access point through a wireless connection, the packet transmission method comprising: determining whether a packet of the AC or the second wireless access point belongs to a Control and Provisioning of Wireless Access Point (CAPWAP) packet; adding a tag into a packet descriptor corresponding to the packet when the packet belongs to the CAPWAP packet, wherein the tag is not included in the packet and configured for identifying whether the packet is the CAPWAP packet; transmitting the packet from the first wireless access point to the second wireless access point, or transmitting the packet from the second wireless access point to the first wireless access point; determining whether the operation of transmitting the packet has an error; determining whether the packet descriptor has the tag when the operation of transmitting the packet has the error; adding the packet into a queue when the operation of transmitting the packet has the error and the packet descriptor has the tag; and generating a transmission error event without adding the packet into the queue when the operation of transmitting the packet has the error and the packet descriptor does not have the tag.

2. The packet transmission method of claim 1, further comprising:
re-transmitting the packet in the queue to the second wireless access point or to the first wireless access point.

3. The packet transmission method of claim 2, wherein the operation of re-transmitting the packet in the queue comprises:
- determining whether the operation of re-transmitting the packet in the queue has an error; and
- removing the packet from the queue when the operation of re-transmitting the packet in the queue has no error.

4. The packet transmission method of claim 2, wherein the operation of re-transmitting the packet in the queue comprises:
- determining whether a transmission state of the packet in the queue is normal;
- re-transmitting the packet in the queue to the second wireless access point or to the first wireless access point when the transmission state of the packet in the queue is normal.

5. The packet transmission method of claim 4, wherein the operation of re-transmitting the packet in the queue further comprises:
- generating an event and informing a main program of CAPWAP of the event when the transmission state of the packet in the queue is abnormal; and
- removing the packet of which the transmission state is abnormal from the queue.

6. The packet transmission method of claim 5, wherein the operation of determining whether the transmission state is normal comprises:
- determining whether a storage period of the packet in the queue is shorter than a predetermined period; and
- determining that the transmission state of the packet in the queue is normal when the storage period is shorter or equal to the predetermined period.

7. The packet transmission method of claim 5, wherein the operation of determining whether the transmission state is normal comprises:
- determining whether a number of times of transmitting the packet in the queue is smaller than or equal to a predetermined number; and
- determining that the transmission state of the packet in the queue is normal when the number of times of transmitting the packet in the queue is smaller than or equal to the predetermined number.

8. The packet transmission method of claim 4, wherein the operation of determining whether the transmission state is normal comprises:
- determining whether a storage period of the packet in the queue is shorter than a predetermined period; and
- determining that the transmission state of the packet in the queue is normal when the storage period is shorter or equal to the predetermined period.

9. The packet transmission method of claim 4, wherein the operation of determining whether the transmission state is normal comprises:
- determining whether a number of times of transmitting the packet in the queue is smaller than or equal to a predetermined number; and
- determining that the transmission state of the packet in the queue is normal when the number of times of transmitting the packet in the queue is smaller than or equal to the predetermined number.

10. The packet transmission method of claim 2, wherein the operation of re-transmitting the packet in the queue comprises:
- decreasing a transmission rate of the packet in the queue.

11. The packet transmission method of claim 1, further comprising:
- excluding performing a packet aggregation procedure on the packet when the packet belongs to the CAPWAP packet.

12. The packet transmission method of claim 1, wherein the operation of determining whether the operation of transmitting the packet has the error comprises:
- determining that the operation of transmitting the packet has the error if the packet is transmitted to the second wireless access point and an acknowledgement (ACK) returned by the second wireless access point is not received during a transmission period; or
- determining that the operation of transmitting the packet has the error if the packet is transmitted to the first wireless access point and an acknowledgement returned by the first wireless access point is not received during the transmission period.

\* \* \* \* \*